United States Patent [19]
Reber

[11] 3,923,257
[45] Dec. 2, 1975

[54] DEVICE FOR EXTRACTING AND SHREDDING FODDER
[75] Inventor: Walter Reber, Saverne, France
[73] Assignee: Kuhn S.A., Saverne, France
[22] Filed: Apr. 2, 1974
[21] Appl. No.: 457,242

[30] Foreign Application Priority Data
Apr. 6, 1973 France .............................. 73.13605
Mar. 5, 1974 France .............................. 74.08090

[52] U.S. Cl. ........................ 241/101.7; 241/152 A
[51] Int. Cl.² ................................................ B02C 19/00
[58] Field of Search ........... 241/101.1, 101.4, 101.7, 241/152 R, 152 A

[56] References Cited
UNITED STATES PATENTS

| 1,801,929 | 4/1931 | Larson | 241/152 X |
|---|---|---|---|
| 1,844,279 | 2/1932 | Gossard | 241/101.7 |
| 2,658,290 | 11/1953 | Pierce | 241/101.7 X |
| 2,685,900 | 8/1954 | Cross | 241/101.7 |
| 3,779,408 | 12/1973 | Ivie | 241/101.7 |

Primary Examiner—Granville Y. Custer, Jr.
Attorney, Agent, or Firm—Young & Thompson

[57] ABSTRACT

The disclosure is of a device permitting especially of extracting and shredding fodder stored in a silo extending along the ground, comprising at least one cutting means and at least one shredding means, which shredding means is driven in rotation about an axis which is both substantially parallel with the cutting front and substantially parallel with the ground, the cutting means and the shredding means being driven with a translational downward movement during working.

27 Claims, 21 Drawing Figures

DEVICE FOR EXTRACTING AND SHREDDING FODDER

INTRODUCTION AND BACKGROUND OF THE INVENTION

The present invention consists especially in a device for extracting and shredding fodder stored in a silo extending along the ground, as for example a channel silo or a clamp silo.

Several types of silage unloaders exist where the extraction and shredding are effected by means of a cutter driven in rotation and having a translational movement downwards during working.

Machines provided with such a cutter have the advantage of a large output in view of the width of the cutting front and of having simple drive kinematics, necessitating no auxiliary motor, in view of the translational downward movement of the cutting generatrix.

However the mass of fodder stored in silos always has a certain resilience which means that to work effectively the cutter must be applied against the fodder with great pressure.

Furthermore machines provided with a cutter possess several drawbacks such as the absorption of high power and therefore the necessity of having a stout and thus bulky design, tearing of the fodder by the teeth, which causes loosening of the front of the silo and favours the penetration of water and air, dispersion of the shredded fodder causing appreciable losses on the ground, and the excessive pressure exerted by the cutter upon the fodder, which renders the teeth practically useless for extraction from clamp silos, which have no lateral retention.

The present invention permits at the same time of eliminating the drawbacks of known machines, of retaining their advantages and of bringing further advantages which will appear from the following description.

Brief Summary of the Invention

The device according to the invention comprises at least one cutting tool and at least one shredding element driven in rotation; during work the cutting tool and the shredding element are driven with a downward translational movement and the axis of rotation of the shredding element is at the same time substantially parallel with the cutting front of the cutting tool and substantially parallel with the ground.

Further Description and Advantages of the Invention

The cutting tool can be a single or double blade-type saw, a band saw, a chain saw or the like or a shaft equipped with cutting teeth, driven in rotation.

In the case of the use of a band saw or the like it will be useful to provide at least two guide rollers at the front. According to the invention these rollers can have teeth on their lower faces.

Further particular features of the invention will appear from the description given hereinafter with reference to the accompanying drawings, which represent by way of nonlimitative example several forms of embodiment of the invention.

BRIEF DESCRIPTION OF THE VIEWS IN THE DRAWINGS

In the drawings:

FIG. 1 represents a profile view of an extraction and shredding device,

FIG. 2 represents the device according to FIG. 1 seen from beneath,

FIGS. 3 and 4 are views respectively similar to FIGS. 1 and 2 but of a modified form in which the saw passes behind the drum, FIGS. 5 and 6 are views respectively similar to FIGS. 1 and 2, but in which the saw reciprocates, FIGS. 9 and 10 are views similar to FIGS. 1 and 2, respectively, but of a double-bladed reciprocating embodiment, FIGS. 11 and 12 are views similar to FIGS. 1 and 2, respectively, but of an embodiment in which the cutting element is a rotary shaft with teeth or tines thereon, FIGS. 13 and 14 represent a device according to the invention where the cutting tool can be displaced vertically in relation to the axis of rotation of the shredding element.

DETAILED DESCRIPTION OF THE PREFERRED EMBODIMENTS

The device according to the invention is preferably but not limitatively driven by the energy of a tractor. It appears from the following description that the drive of the cutting tool and of the shredding element is relatively simple.

The extraction and shredding devices as represented in FIGS. 1 to 16 are driven with a downward translational movement.

According to the invention the working width 1 of the cutting tool can be greater than the front width 2 of the frame which permits the translational downward displacement of the cutting tool and the shredding element. This characteristic permits of eliminating the dead zones on the sides and penetration into the silo without causing blockage of the device.

According to an important feature of the invention, the cutting edge of the cutting tool 3, 4, 5, 6, 7 or 40 will be preferably placed closer to the ground than the axis 8 of rotation of the shredding element 9 during work. This characteristic permits of substantially reducing the power required for the drive of the shredding element 9.

Likewise a fairing 10 can extend downwards as far as the cutting tool. This characteristic permits of appreciably reducing the losses of fodder by projection into undesired zones. In the case of FIGS. 1 and 2 the cutting tool 3 is a band saw or the like guided so as to pass partially in front of the shredding element 9 and partially within it. The shredding element 9 is a hollow drum having tines 11 on its periphery. These tines can equally be blades, flails or similar elements. They can favour the projection of the fodder in the desired direction. The drum of the shredding and projection element 9 rotates, preferably but non-limitatively, from below upwards in the region of contact with the product to be extracted, i.e., upwardly on the forward side of the rotor.

Figure 17:
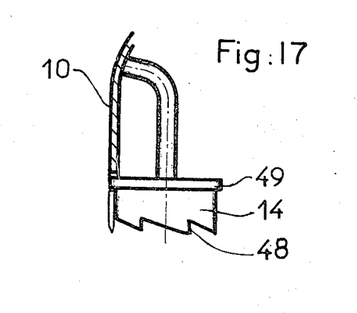
FIG. 17 represents a profile view of a saw guide roller, FIGS. 18, 19 and 20 each represent an example of the guidance of the saw.

The said drum is guided laterally by rollers 12 mounted for rotation about horizontal axes on horizontal axes fixed to the frame 13 (see FIG. 2). The saw 3 can be guided by rollers 14 fixed to the frame 13 and/or guide fittings 15, 16, 17 (FIGS. 18–20) fixed to the fairing 10. Rollers 14 can be mounted on fairing 10 as shown in FIG. 17.

Figure 21:
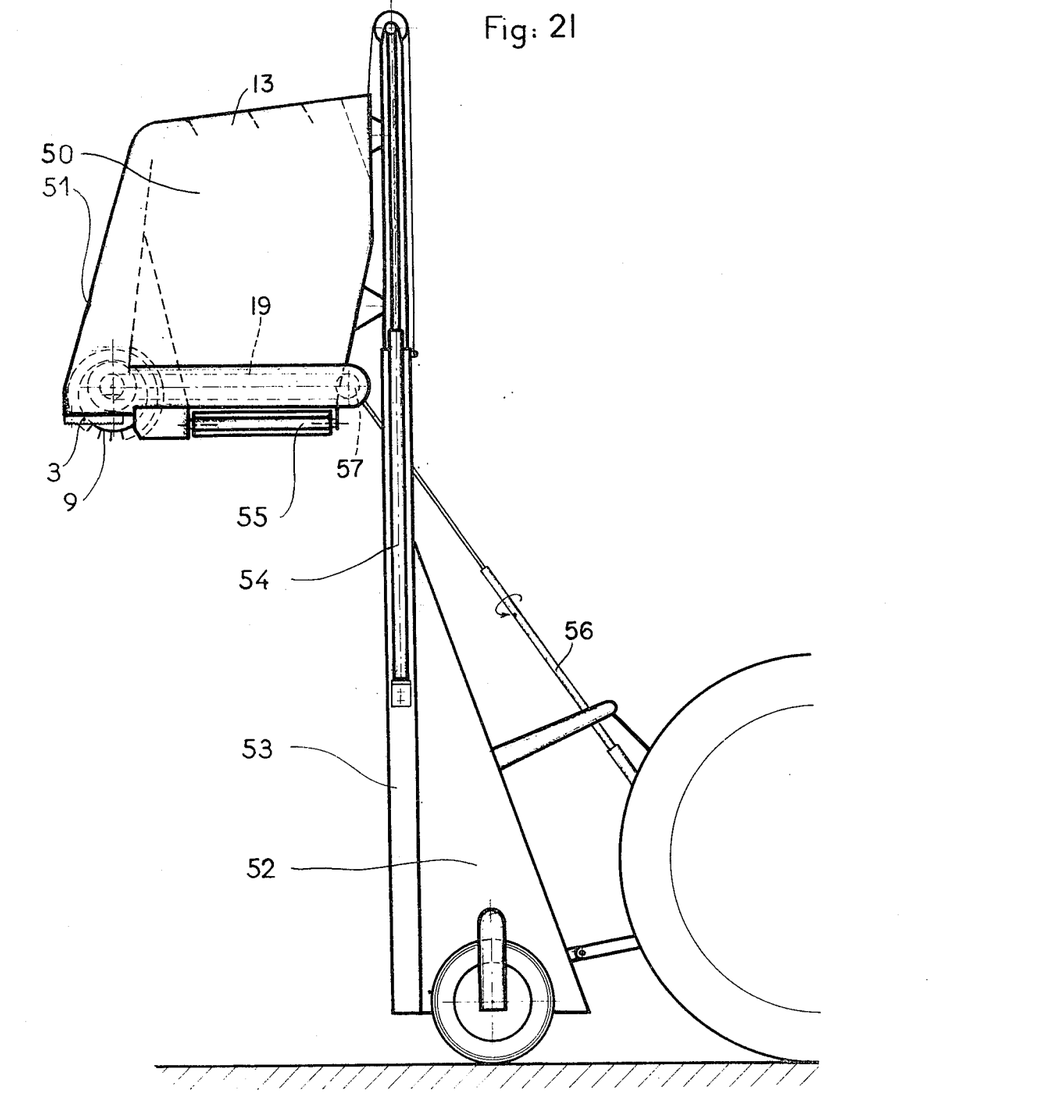
FIG. 21 represents a device according to the invention fitted to a silage extraction hopper coupled to a tractor.

The drive of the device is carried out in the following manner. A shaft 18 is driven in rotation by a chain 19 driven by appropriate gearing through a power take-off from a tractor (FIG. 21). A pinion 20 fast with this shaft drives the drum of the shredding element 9 through the internally toothed wheel 21.

Likewise the shaft 18 drives the saw 3 in a continuous movement by means of a bevel gearing 22, 23 and a roller 24.

To avoid the penetration of fodder inside the drum of the shredding element 9 a sealing lip 25 can be provided between the said drum and the frame 13.

In the example of embodiment according to FIGS. 3 and 4 the saw 3 passes in front of and behind the drum of the shredding element 9. The said drum is fast with the shaft 26 and driven in rotation by the latter.

The saw 3 is driven with continuous movement by a shaft 29 driving a roller 30 by means of a bevel gearing 27 and 28. The two shafts 26 and 29 are driven in rotation by the chain 19.

In the example of embodiment according to FIGS. 5 and 6 the cutting tool 3' is a band saw or the like driven with a reciprocating movement. The ends of the saw are connected by connecting rods 31 and 32 to the crank plates 33 and 34 fast with the shaft 35.

Figure 7:
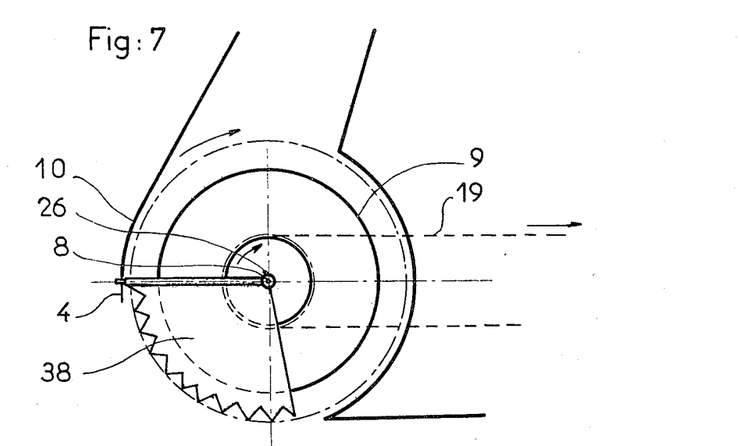
FIGS. 7 and 8 are views similar to FIGS. 1 and 2, respectively, but of a modification in which the saw reciprocates only in a straight line.
Figure 8:
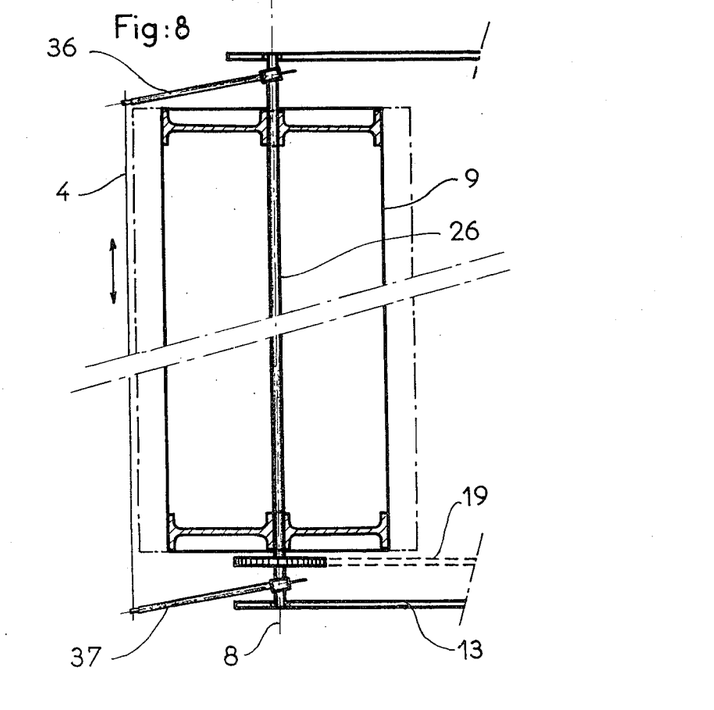

In the example of embodiment according to FIGS. 7 and 8, the cutting tool 4 is a bladed saw which may have cutting teeth thereon like saw 3. See also FIGS. 18–20. It is driven with a reciprocating movement by connecting rods 36 and 37 articulated on the shaft 26. These connecting rods are articulated so as to have a lateral oscillation when the shaft 26 is driven in rotation, the axes of their journals being for this purpose disposed at an acute angle to the axis of shaft 26, as shown in FIG. 8. The drum of the shredding element 9 is fast with the shaft 26.

The said connecting rods are provided with clearing deflectors 38 directed downwards. These deflectors cut the fodder and move it to either side so that some of the fodder is moved towards the drum of the shredding element 9.

FIGS. 9 and 10 are distinguished from FIGS. 7 and 8 by the fact that the blades 5 and 6 are double and in sliding contact with each other and each driven at one end by connecting rods 36 and 37.

In the example of embodiment according to FIGS. 11 and 12 the cutting tool is a shaft 40 provided with cutting teeth or tines, the overall diameter of which is less than half of the overall diameter of the shredding element 9. The said shaft 40 is rotatably supported by its ends in frame 13' and is driven in rotation by a transmission element such for example as a chain or belt 41, so as to rotate in a manner such as to converge at the point of contact with the product to be extracted with the shredding element 9 provided with shredding and projection elements. This shaft 40 provided with cutting teeth or tines is driven at a preferably higher rotation speed than the rotation speed of the shredding element 9.

The drum of the shredding element 9 can comprise at its ends cutting elements 42 concentric with the rotation axis 8 of the said shredding element.

The device as represented in FIGS. 13 and 14 comprises a cutting tool 40 which can be displaced vertically in relation to the rotation axis 8 of the shredding element 9. The said cutting tool is held by two lateral arms 43, 44 articulated on an axis substantially parallel with the rotation axis 8 of the shredding element 9, which axis may coincide with the said rotation axis 8.

The cutting tool 40 can thus be displaced vertically by means of a lever 45 which can be locked in several positions on a slotted segment 46.

The vertical displacement of the cutting tool 40 exposes the shredding element 9, which permits the latter to pick up the fodder which has fallen on to the ground and project it into a hopper, when the tractor and the device carried thereby move horizontally forward.

Figure 15:
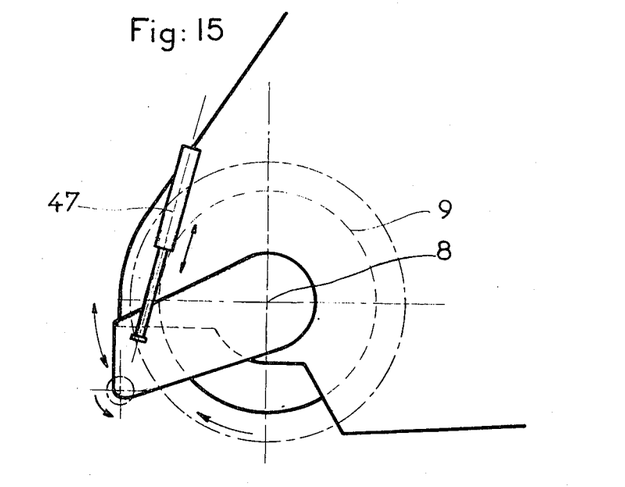
FIGS. 15 and 16 represent a variant of the device as represented in FIGS. 15 and 16.
Figure 16:
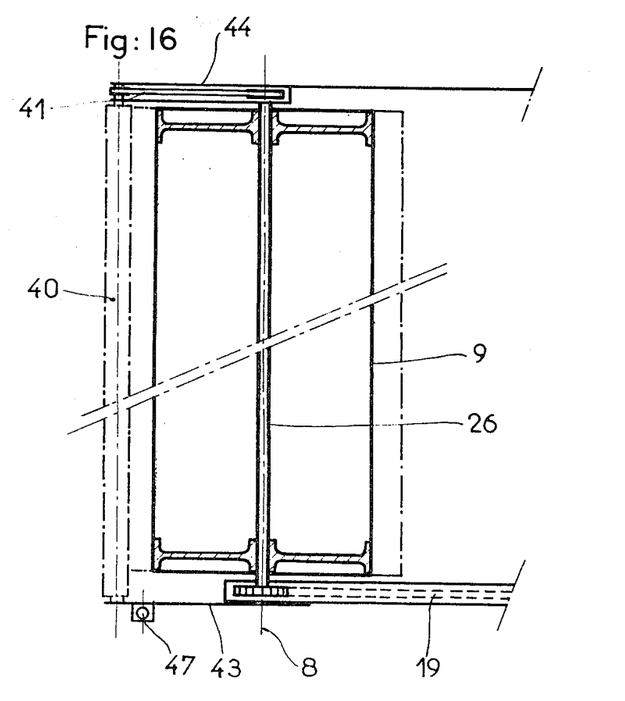

In the device as represented in FIGS. 15 and 16 the cutting tool 40 can be displaced vertically by means of a hydraulic jack 47.

FIG. 17 represents a guide roller 14 for the cutting element. On the lower face it is provided with teeth 48 to facilitate the downward translational displacement of the device. This roller comprises a shoulder 49 to prevent jumping off by the cutting tool during work.

Figure 18:
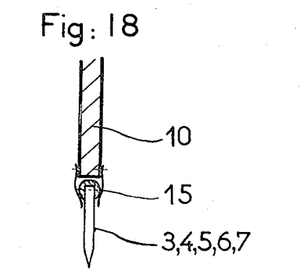
Figure 19:
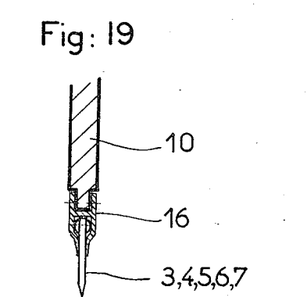
Figure 20:
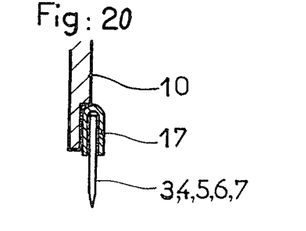

In FIGS. 18, 19 and 20 the saw 3, 4, 5, 6, or 7 is guided by guide fittings 15, 16 and 17 and attached to the fairing 10. They can be interchangeable. These guide fittings can be spring blades 15 or slideways 16 and 17 preferably of synthetic material in order to reduce the coefficient of friction.

A device according to the invention can be fitted on a hopper 50 as represented in FIG. 21, but likewise on a trailer and/or an independent silage extractor.

The silage extractor hopper 50 can be mounted on the three-point linkage system of a tractor. The cutting tool 3, 4, 5, 6, 7 or 40 and the drum of the shredding element 9 are disposed at the front and at the base of the hopper 50. A fairing 51 of hopper form favours the projection of the shredded fodder towards the hopper 50. Moreover it prevents any dispersion of the fodder. This hopper moves on a chassis 52 each of the vertical telescopic uprights 53 of which comprises a translational guide permitting the hopper to move vertically from above downwards and vice versa under the action of at least one hydraulic jack 54. Fodder distribution is effected to the left and right of the hopper 50 by virtue of a discharge device 55 placed at the base of the hopper The drive of the moving parts previously described is from the tractor, which rotates shaft 56 which in turn rotates bevel gearing 57 to drive chain 19.

What is claimed is:

1. A device for extracting and shredding fodder stored in a silo extending along the ground, comprising a vehicle, cutting and shredding means mounted on the front of the vehicle, means for moving said cutting and shredding means bodily upwardly and downwardly together as a unit relative to the vehicle, the shredding means comprising a rotor mounted for rotation about a horizontal axis transverse to the path of movement of the vehicle, at least a portion of said cutting means being downwardly directed and extending below said axis of rotation and being disposed in front of said rotor.

2. A device as claimed in claim 1, and a frame on which said cutting means is mounted, said cutting means being wider than said frame in a direction parallel to said axis.

3. A device as claimed in claim 1, said rotor having shredding projections thereon and rotating in a direction such that said projections move up on the forward side of said rotor.

4. A device as claimed in claim 1, said cutting means being mounted for cutting movement relative to said rotor, and means for driving said cutting means from said vehicle.

5. A device as claimed in claim 1, said cutting means comprising a band saw having downwardly directed saw teeth, and means to move said band saw horizontally.

6. A device as claimed in claim 5, in which said band saw is a single-bladed saw.

7. A device as claimed in claim 5, and rollers rotatable about a vertical axis on which said band saw is guided.

8. A device as claimed in claim 7, said rollers having teeth on their lower faces.

9. A device as claimed in claim 7, and downwardly facing annular shoulders on said guide rollers for retaining said band saw on said rollers.

10. A device as claimed in claim 1, in which said cutting means comprises a shaft rotatable about an axis parallel to but below the first mentioned axis and having cutting teeth thereon.

11. A device as claimed in claim 10, in which said rotor rotates in a direction so as to move up at its front such that its forward side moves up, said shaft with cutting teeth rotating in the opposite direction.

12. A device as claimed in claim 11, in which the orbit of said cutting teeth has a diameter less than half the diameter of said rotor.

13. A device as claimed in claim 1, in which said cutting means comprises a saw driven horizontally with continuous movement.

14. A device as claimed in claim 1, in which said cutting means comprises a saw driven horizontally with reciprocal movement.

15. A device as claimed in claim 1, and means for moving said cutting means vertically relative to said rotor.

16. A device as claimed in claim 1, and lever means for displacing said cutting means vertically relative to said rotor.

17. A device as claimed in claim 1, and hydraulic jack means for displacing said cutting means vertically relative to said rotor.

18. A device as claimed in claim 1, and a casing extending downwardly in front of said rotor at least as far as said cutting means.

19. A device as claimed in claim 18, said cutting means comprising a horizontally moving saw guided by a lower portion of said casing.

20. A device as claimed in claim 1, said cutting means comprising a horizontal saw blade with downwardly directed teeth, and connecting rods articulated on a shaft supporting said rotor, said connecting rods being secured to the ends of said saw blade for reciprocating said blade in a horizontal direction upon rotation of said shaft.

21. A device as claimed in claim 20, and deflectors for fodder secured to said rods.

22. A device as claimed in claim 1, said cutting means comprising a band saw that passes in front of and inside said rotor.

23. A device as claimed in claim 1, said cutting means comprising a band saw that passes in front of and behind said rotor.

24. A device as claimed in claim 1, and a frame on which said rotor is mounted on said vehicle, and a sealing lip between said rotor and said frame.

25. A device as claimed in claim 1, and a hopper carried by said vehicle for receiving fodder from said rotor.

26. A device as claimed in claim 25, said hopper being above and behind said rotor.

27. A device as claimed in claim 25, and hydraulic jack means carried by said vehicle for vertically displacing said hopper and rotor and cutting means vertically as a unit.

* * * * *